United States Patent [19]
Lagsdin

[11] Patent Number: 5,466,004
[45] Date of Patent: Nov. 14, 1995

[54] STABILIZER PAD FOR EARTH MOVING APPARATUS

[76] Inventor: Andry Lagsdin, 54 King Hill Rd., Hanover, Mass. 02339

[21] Appl. No.: 283,247

[22] Filed: Jul. 29, 1994

[51] Int. Cl.$^6$ .................................................. B60S 9/02
[52] U.S. Cl. ................... 280/763.1; 280/764.1; 212/304
[58] Field of Search ............... 280/764.1, 763.1; 212/189; 305/51, 54, 55; 292/183, 238

[56] References Cited

U.S. PATENT DOCUMENTS

| | | | |
|---|---|---|---|
| 2,277,939 | 3/1942 | Thalhammer | 248/193 |
| 3,219,362 | 6/1964 | Epstein | 280/150.5 |
| 3,244,301 | 4/1966 | Vaughan | 124/138 |
| 3,495,727 | 2/1970 | Long | 214/138 |
| 3,642,242 | 2/1972 | Danekas | 248/354 R |
| 3,721,458 | 3/1973 | Mitchell | 280/150.5 |
| 3,897,079 | 7/1975 | MacKenzie et al. | 280/150.5 |
| 3,913,942 | 10/1975 | MacKenzie et al. | 280/150.5 |
| 3,930,668 | 1/1976 | Schuermann et al. | 280/150.5 |
| 4,023,828 | 5/1977 | MacKenzie et al. | 280/763 |
| 4,039,206 | 8/1977 | Nault | 280/763 |
| 4,546,996 | 10/1985 | Hanson | 280/764.1 |
| 4,761,021 | 8/1988 | Lagsdin | 280/764.1 |
| 4,889,362 | 12/1989 | Lagsdin | 280/763.1 |
| 5,050,904 | 9/1991 | Lagsdin | 280/764.1 |
| 5,051,057 | 9/1991 | Kremer | 280/764.1 X |
| 5,054,812 | 10/1991 | Lagsdin | 280/764.1 |

FOREIGN PATENT DOCUMENTS

| | | |
|---|---|---|
| 492912 | 5/1953 | Canada. |
| 1029715 | 4/1978 | Canada. |
| 1036148 | 8/1978 | Canada. |

Primary Examiner—Josie A. Ballato
Attorney, Agent, or Firm—Wolf, Greenfield & Sacks

[57] ABSTRACT

A reversible stabilizer pad for use with earth moving equipment having a plate with first and second ground contact faces pivotally coupled to a stabilizer arm such that the plate can rotate about the arm to engage the ground surface with either ground contact face with the arm having to pass through a channel in the pad in order to change ground contact faces and a friction member fixed to the arm so that when the arm passes through the channel in at least a first direction, the friction member is trapped in the gap between the arm and the pad and provides a frictional resistance to further rotation in the first direction.

15 Claims, 5 Drawing Sheets

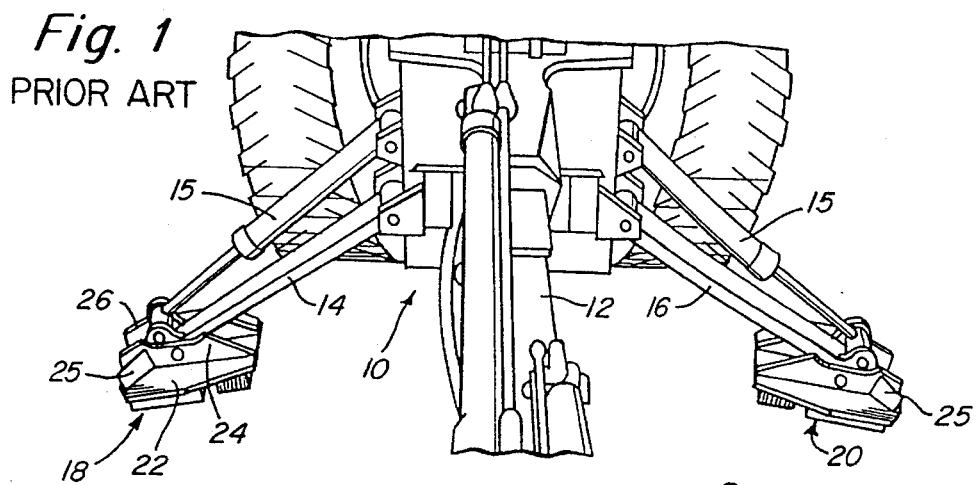
Fig. 1 PRIOR ART
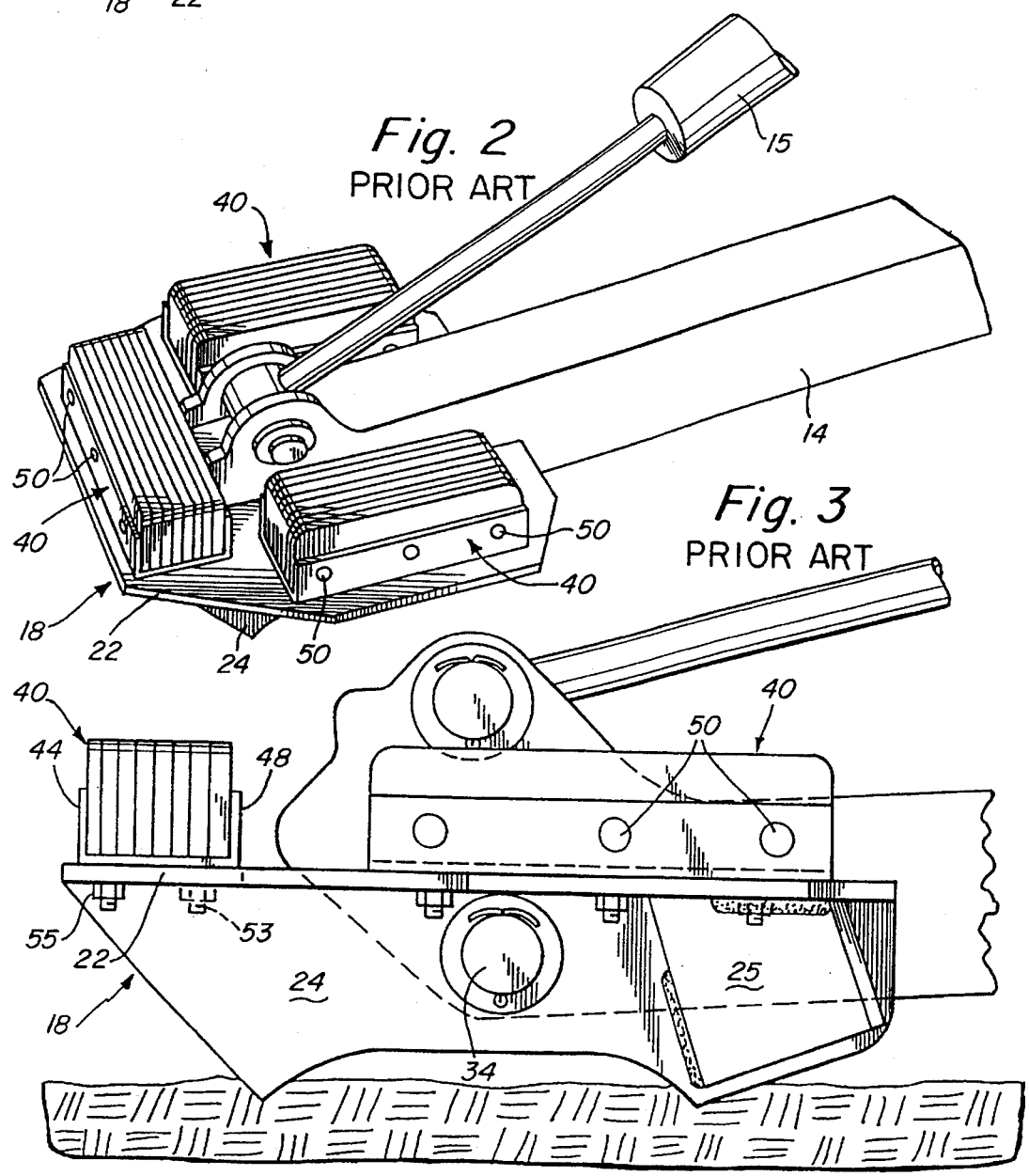
Fig. 2 PRIOR ART
Fig. 3 PRIOR ART

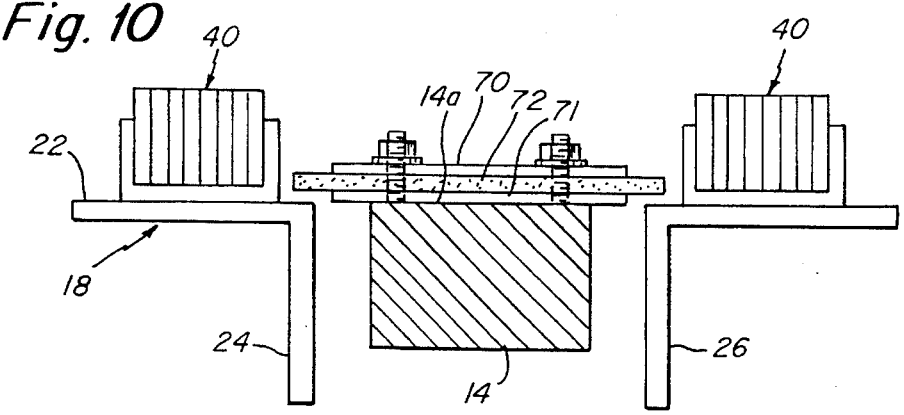
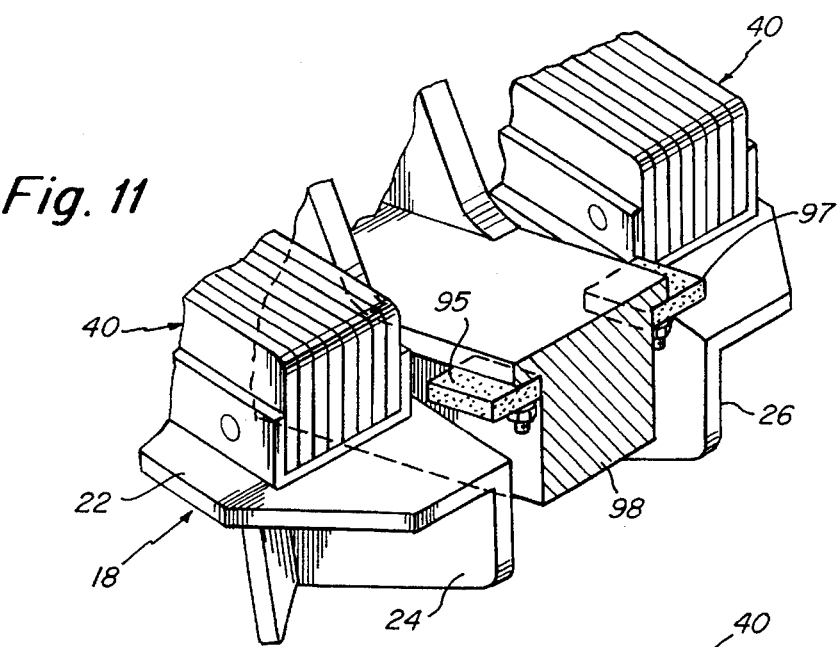
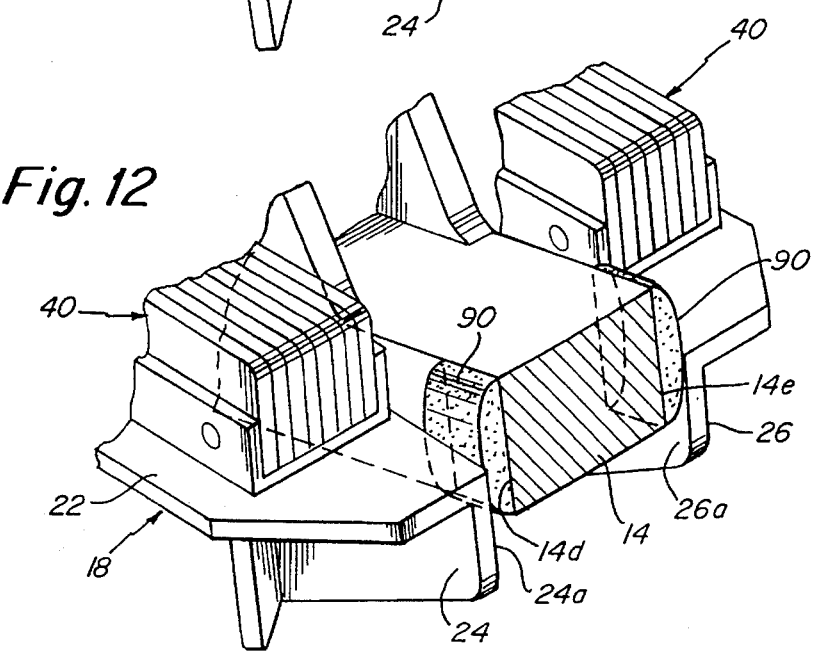

STABILIZER PAD FOR EARTH MOVING APPARATUS

FIELD OF THE INVENTION

The invention relates to stabilizer pads for earth moving vehicles. More particular, the invention pertains to an apparatus for preventing a pivotally mounted, two-way stabilizer pad from reversing its orientation under its own weight.

BACKGROUND OF THE INVENTION

U.S. Pat. No. 4,889,362 discloses a reversible stabilizer pad for earth moving vehicles having a generally flanged first surface for engagement with gravel and soft earth, for example, and a resilient surface for engagement with concrete or asphalt. This patent describes the use of rubber pads on one side of the stabilizer pad for ground contact when the vehicle is on a finished surface, such as concrete or asphalt, and flanges with grouser points on the opposite side of the stabilizer pad for ground contact when the machine is on an unfinished but hard ground surface that requires that the pads dig into the surface in order better anchor and stabilize the machine when encountering difficult digging conditions. The flanged side of the pad is unsuitable for contact with finished surfaces since it could damage and/or mar such surfaces. The stabilizer pad is pivotally mounted to the end of an hydraulically operated arm such that the pad may be rotated to contact the ground with either the rubber pad side or the flange side facing down to contact the ground surface.

When the earth moving vehicle is moved into position, if extra stability is needed, the stabilizer arms, on which the pads are mounted, are hydraulically operated to move from a retracted position, in which the arms generally extend upwardly and out of the way, to a use position, in which the arms extend downwardly at an angle with the pads contacting the ground surface. The arms and pads, of course, are positioned to provide extra stability to the vehicle. When the vehicle is to be moved, the arms are lifted back to the retracted position, the vehicle is moved to a new operating location and the stabilizer arms are brought down into the use position again, if necessary.

In prior stabilizer pad constructions such as the one described in U.S. Pat. No. 4,889,362, there has been a tendency for the pad to self-flip when the earth moving machine pad support arm is lifted. The self-flipping problem relates primarily to flipping from flanged side down to rubber pad side down because the rubber pad side is typically much heavier than the flange side. When the pad inadvertently flips sides, an operator must manually flip the pad back so that the proper side is facing down. Frequently, however, the operator does not realize that the pad has self-flipped or, even if he/she realizes it, does not bother to fix it. Accordingly, the machine is used with the wrong side of the stabilizer pad in contact with the ground surface, which could result in increased hazard as well as increased wear of the rubber pads, leading to premature need for replacement. The self-flipping of the pad can be remedied with a securing or engaging bolt that is required to be secured in each position of the pad and to be disassembled and re-secured when the position of the pad is to be changed. This becomes time consuming and furthermore may involve parts that are easily lost. Further, the operator simply may not use the securing pin or bolt.

U.S. Pat. No. 4,889,362 discloses an automatically operatable latch that is adapted to rotate into an engagement with the pad when the pad is in a ground engaging surface, and furthermore adapted to automatically rotate by gravitational force out of engagement with the pad when the arm of the earth moving machine that supports the pad is lifted. In this way, when the support arm is lifted, the latch disengages from the pad and the pad is easily rotated to its opposite position. It has been found, however, that rocks, gravel and other debris frequently get caught in the automatic latch disclosed in U.S. Pat. No. 4,889,362 which can prevent the latch from releasing when the arm is lifted. In many stabilizer constructions, however, the pad must rotate to some extent when the arm is lifted in order to allow the piston of the arm to retract into the cylinder. Failure of the latch to release can thus result in damage to the arm or pad.

It is an object of the present invention to provide an improved stabilizer pad/arm construction for an earth moving machine.

It is a further object of the present invention to provide a stabilizer pad/arm construction for an earth moving machine which will not flip sides unintentionally.

It is another object of the present invention to provide a self-flip prevention mechanism which can be easily added to virtually any stabilizer pad/arm construction.

It is yet one more object of the present invention to provide a stabilizer pad/arm construction for an earth moving machine which will not jam.

SUMMARY OF THE INVENTION

The invention is a stabilizer pad/arm construction for use with earth moving equipment. The stabilizer pad is coupled to the stabilizer arm so as to be pivotable about an axis of rotation. The stabilizer pad has a plate having first and second faces adapted to provide optimal contact patches with the ground, one side being particularly adapted for contacting soft earth or gravel and the other side particularly adapted for contacting asphalt, concrete or another hard surface. The stabilizer pad is rotatable about the pivot in order to be able to contact the ground with either side facing the ground.

In order to prevent the pad from accidentally rotating under its own weight so as to switch ground contact sides when the arm is lifted, the pad is coupled to the arm such that, in order for the pad to flip sides, the arm must pass through a channel defined by side walls of the pad. A steel plate is coupled transversely to the arm to define two small gaps between the side walls and the edges of the steel plate. A rubber strip slightly longer than the steel plate as well as the channel is sandwiched between the arm and the steel plate and, when the pad is rotated to a certain position relative to the arm, the rubber strip contacts the side walls of the pad. The thickness of the pad is greater than the width of the gaps between the edge of the steel plate and the side walls. Accordingly, when the pad is rotated in a direction such that the pad enters the gap before the steel plate, the edges of the strip which extend beyond the edges of the plate bend upward and get trapped or jammed in the gap between the edge of the plate and the side wall. Since the strip is thicker than the gap, it is compressed and provides a high frictional resistance to further rotation of the pad relative to the arm in that direction. Frictional resistance is a function of the thickness of the pad relative to the thickness of the gap and the frictional coefficient of the surface of the pad and the side walls. The frictional resistance is selected such that the weight of the pad is insufficient to overcome the frictional resistance to further rotation, but small enough to allow the friction to be overcome with additional manual pressure when it is desired to flip the pad over.

Alternately or additionally, the strip may be resilient but relatively stiff so as to resist the bending necessary for the strip to fold inwardly on itself and fit through the gaps.

BRIEF DESCRIPTION OF THE DRAWING

FIG. 1 is a fragmentary view of a typical loader/backhoe having stabilizer pads of the prior art secured thereto.

FIG. 2 is a perspective view of the stabilizer pad and arm of FIG. 1 in a gravel or dirt engaging position.

FIG. 3 is a side elevational view of the stabilizer pad and arm construction in the position of FIG. 2.

FIG. 10 is a schematic cross-sectional end view similar to FIG. 7 showing a first alternative embodiment of the present invention.

FIG. 11 is a cross-sectional end view similar to FIG. 7 showing a second alternative embodiment of the present invention.

FIG. 12 is a cross-sectional end view similar to FIG. 7 showing a third alternative embodiment of the present invention.

DETAILED DESCRIPTION OF THE INVENTION

Figure 4:
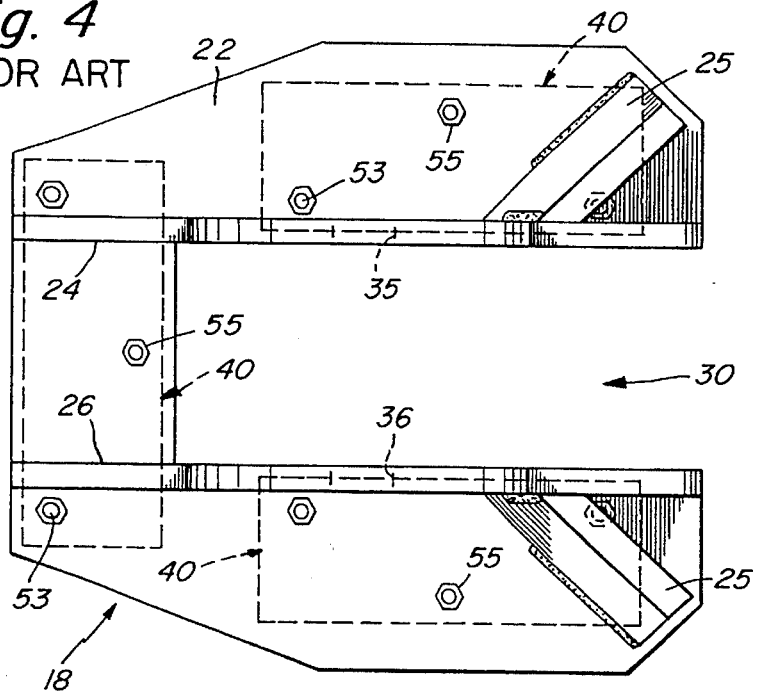
FIG. 4 is a bottom plan view of a stabilizer pad of FIGS. 1–3 shown uncoupled from a stabilizer arm.

FIG. 1 is a fragmentary view of a typical loader/backhoe 10 having a shovel mechanism 12, stabilizer arms 14 and 16, and associated stabilizer pads 18 and 20, respectively. Hydraulic piston 15 may operate each of the stabilizer arms 14 and 16 independently. When the equipment is being moved, the pistons associated with each cylinder are withdrawn so that the support arms pivot and are thus elevated above ground level. As the arms are pivoted upwardly, it is in that position that the pads may then be reversed. When support arms are to be used, the piston associated with each of the cylinders are extended to the position shown in FIG. 1 for ground engagement.

With reference to FIGS. 2 and 3, the stabilizer pad 18 generally includes a flat plate 22 that has extending normal to the surface thereof the flanges 24 and 26, both extending on one side from the surface of plate 22. The stabilizer pad is also provided with supporting webs or ribs 25, one associated with each flange. These provide additional support for the flanges 24 and 26. The plate 22 is notched at 30 between flanges 24 and 26 such as illustrated in FIG. 4. The plate is notched so as to accommodate the arm 14 and to enable the reversible rotation of the stabilizer pad. The arm 14 includes a journal end for accommodating pin 34. Pin 34 also fits within holes 35 and 36 of flanges 24 and 26, respectively. The pin 34 may be secured in place by means of a typical cotter pin as illustrated in FIG. 3, or the pin 34 may be threaded to accommodate a nut. FIG. 2 most clearly illustrates the resilient side of the reversible stabilizer pad. The resilient side of the pad is in the form of three laminated pads 40.

The drawings illustrate the basic components comprising the stabilizer member resilient pad structure. This includes the angle irons 44 and 48. Both angle irons include a base leg and an upright leg. Each of the upright legs has holes therein for receiving the elongated securing pins 50. The laminated pads are secured to the plate 22 by means of a series of bolts 53 each having associated nuts 55.

Figure 5:
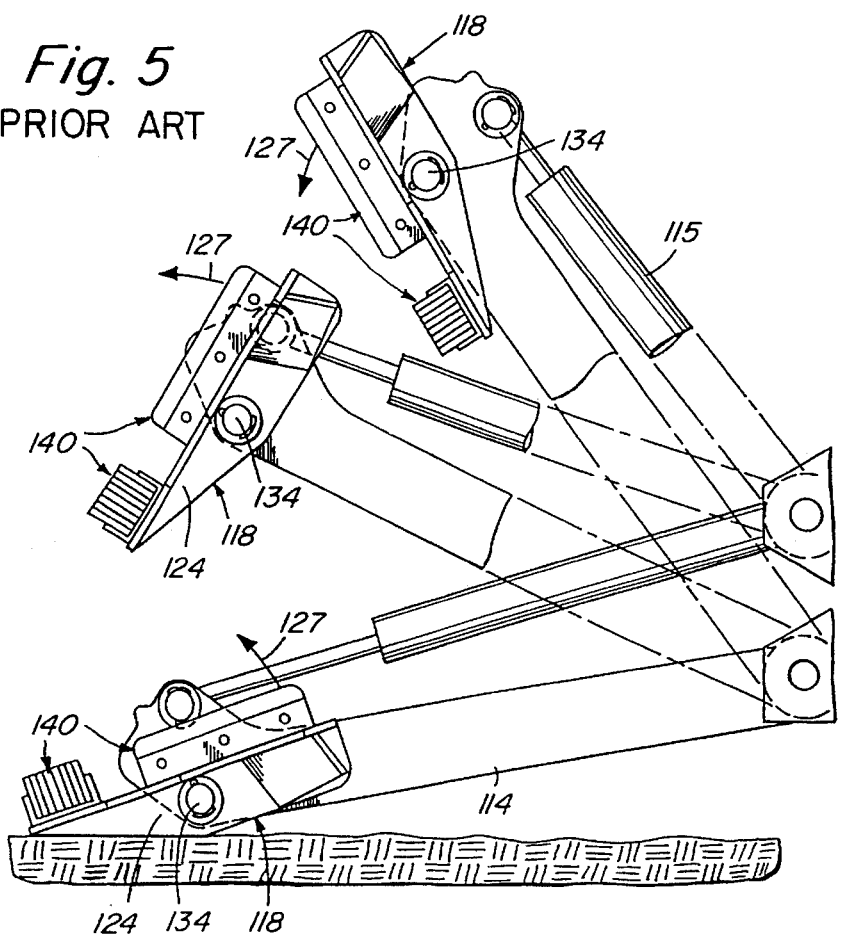
FIG. 5 is a sequential diagram illustrating the prior art problem of stabilizer pad self-flipping.

FIG. 5 illustrates a sequence of events as a support arm 114 is lifted. In the bottom position, the pad is illustrated with its flanged web in contact with the ground surface. In the top position it is noted that the pad has now self-flipped so that the resilient side of the pad is facing substantially downwardly. The support arm 114 may be lifted in a rather jerky motion. Because of certain inertia, the pad is apt to flip on its own. This is undesirable because, typically at a construction or other site at which earth moving equipment is being used, the ground surface is relatively consistent, either being soft, so that one desires the flanged side to be facing down, or hard, so that one desires the laminated side to be facing down. At such a site, the earth moving equipment typically is moved many times, requiring stabilizer arms to be retracted upwardly so that the earth moving machine can be moved and the stabilizer arms to be put down again with the same side facing down. Only when the ground surface changes, a relatively rare occurrence, is it desired that the stabilizer pad flip over.

Although the pad does not tend to self-flip from the rubber side to the flanged side, because the rubber side of the pad is considerably heavier than the flanged side, the pad does tend to self-flip from the flanged side to the rubber pad side.

In the sequence of FIG. 5, which should be viewed from the bottom up, the pad is shown engaging the ground surface at the bottom of the figure. As the arm 114 is raised, there is an inertia force in the direction of arrow 127. This same inertia force is also illustrated in the middle position illustrated in FIG. 2 wherein the pad is illustrated as now having been half-flipped upon a raising of the support arm 114. The top position in FIG. 4 illustrates the pad now completely reversed. When the arm 114 is now lowered again, the wrong surface will be facing downward and will engage the ground since the pad has self-flipped.

The present invention provides a stabilizer pad/arm construction which eliminates the self-flipping problem. Further, virtually any other stabilizer pad/arm construction can be easily and inexpensively modified to the construction of the present invention to eliminate the problem of self-flipping.

Figure 6:
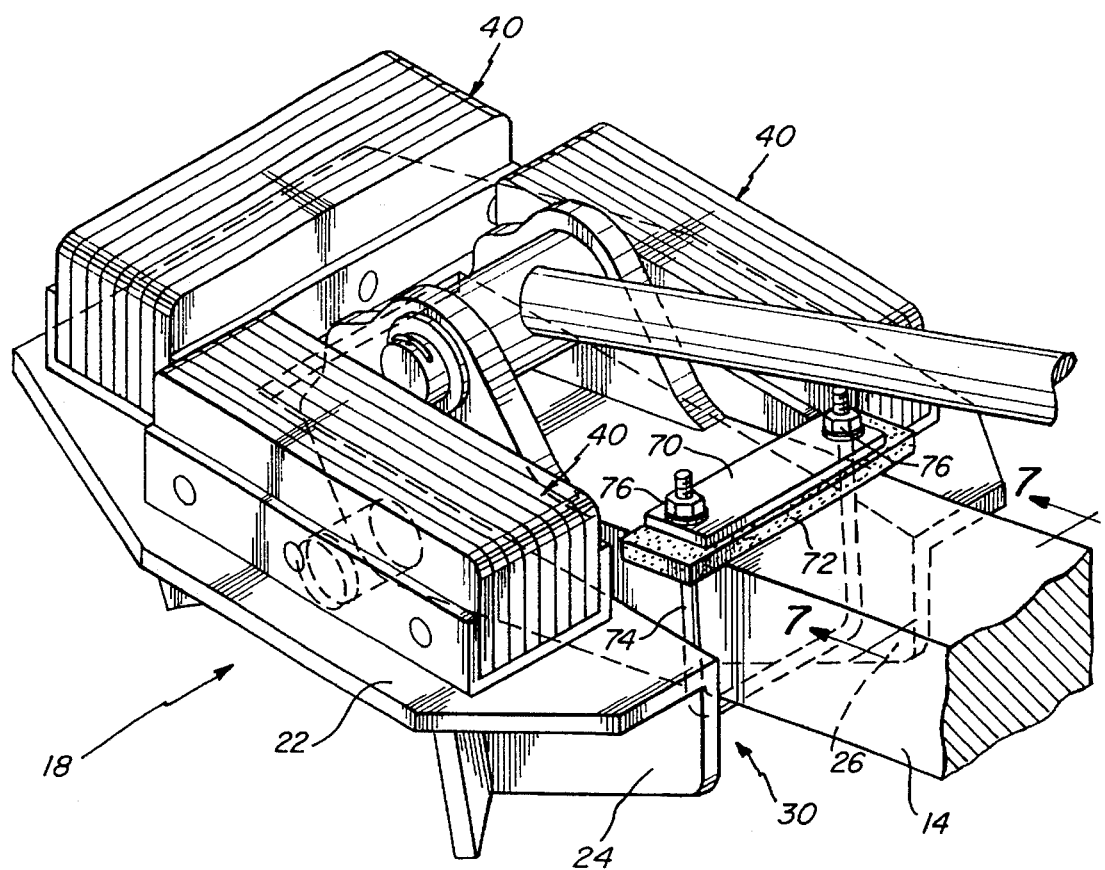
FIG. 6 is a fragmentary view of the stabilizer pad of the present invention coupled to a stabilizer arm.
Figure 7:
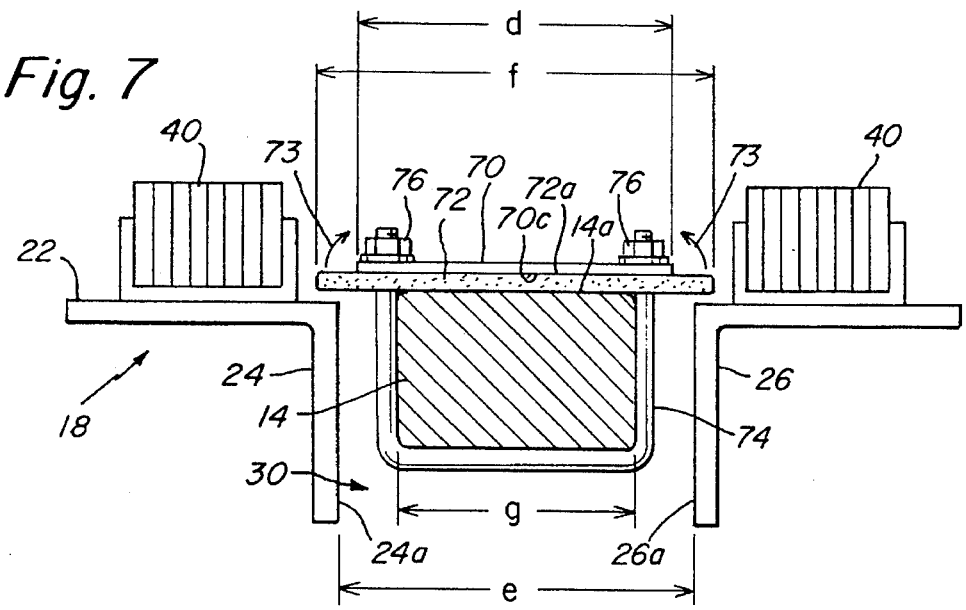
FIG. 7 is a schematic cross-sectional end view taken along line 7 of FIG. 6 showing the pad in a gravel contacting position.
Figure 8:
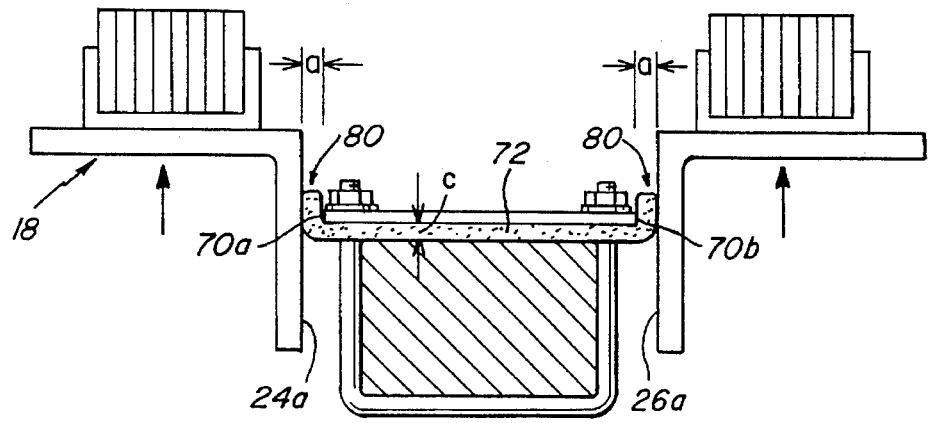
FIG. 8 is a schematic cross-sectional end view similar to FIG. 7 showing the arm and pad in a second relative rotational position.
Figure 9:
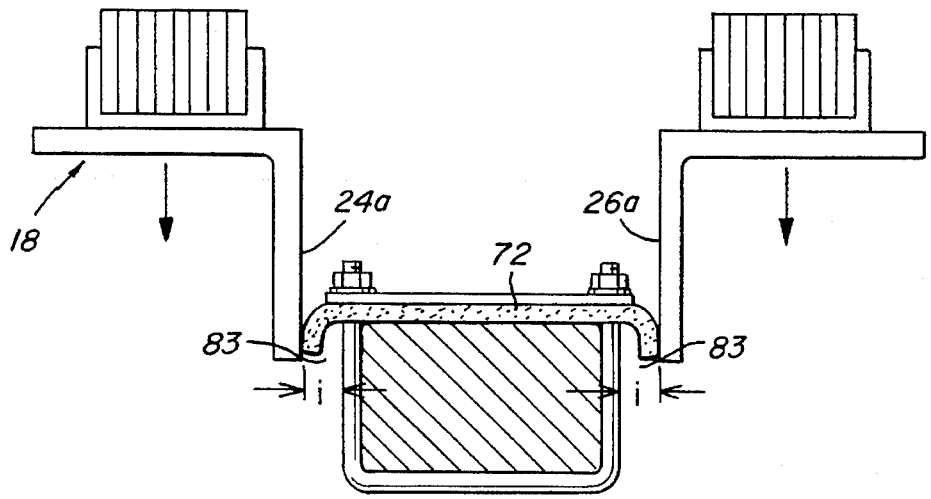
FIG. 9 is a schematic cross-sectional end view similar to FIG. 7 showing the arm and pad in a third relative rotational position.

A preferred embodiment of the invention will now be described in detail with reference to FIGS. 6–9. The pad 18 comprises a steel plate 22 which is adapted to contact the ground with either side of the plate facing downwards. In FIG. 6, the side having flanges 24 for contact with soft earth is facing downward and the side bearing rubber pads 40 is facing upwardly. The stabilizer arm 14 extends in channel 30 (best seen in FIGS. 7, 8 and 9) and is pivotally coupled to the pad 18 in the manner best illustrated by FIG. 3 and discussed above. A steel plate 70 and a high friction, resilient strip 72 are fixed to the arm by a partially threaded U bolt 74. As best seen in FIGS. 7–9, the U bolt 74 surrounds the arm 14 and engages holes through the plate 70. Threaded nuts 76 engage the threaded ends of the U bolts to secure the plate to the U bolt around the arm. The strip 72 is sandwiched between upper surface 14a of the arm 14 and the lower surface 70a of the plate 70. The strip is formed of rubber or another flexible, abrasion resistant, material, such as spring tempered metal or neoprene. Preferably, the material also has a relatively high coefficient of friction, e.g., rubber or neoprene. The steel plate 70 is of a length, d, which is greater than the width, g, of the arm yet smaller than the width, e, of the channel 30. The rubber strip 72 is of a length, f, greater than the width, e, of the channel such that, when the arm is rotated into the channel the rubber strip 72 does not fit through the channel with the rubber strip 72 in its fully extended horizontal position, as best seen in FIG. 7. Since the length, d, of the plate 70 is less than the width, e, of the channel, small gaps 80 of width a (see FIG. 8) exist between the edges 70a and 70b of the steel plate 70 and the side walls 24a and 26a of the channel 30. The thickness, c, of the rubber strip 72 is greater than the width, a, of gaps 80. The strip 72 is preferably rubber such that it has a surface or relatively high friction, is compressible in the direction of its thickness, c, and can be flexed under force in the direction of the arrows 73 in FIG. 7.

When the arm and pad are in the relative rotational relationship shown in FIG. 7, the pad can be forced to rotate further into the position shown in FIG. 8 (rotated counterclockwise in the view of FIG. 6) such that the end portions of the rubber strip 72 which extend beyond the edges 70a and 70b of the plate 70 flex upwardly and become trapped between the side walls 24a and 26a and the edges 70a and 70b of the plate 70, providing a frictional resistance to further rotation in that direction. The particular thickness, c, of the rubber pad 72 and/or its surface coefficient of friction is selected such that the inertia of the pad itself towards self-flipping cannot overcome the frictional resistance, but application of manual pressure to further rotate the pad in the counterclockwise direction can overcome the frictional resistance to rotation in that direction. Accordingly, someone wishing to flip the pad so that the rubber side faces down can do so easily, but the pad will not be able to self-flip accidentally under solely its own inertia.

Typically, stabilizer pads are likely to self-rotate only from flange side down to rubber side down, and not vice versa, because the rubber side typically is much heavier than the flanged side. Accordingly, it is preferable that there is substantially less or even no resistance to rotation of the arm through the channel in the opposite direction (in the clockwise direction in the view shown in FIG. 6). Accordingly, the gap 83 between the edges of the U bolt and the side walls is of a width, i, (see FIG. 9) greater than the thickness, c, of the pad 72. Accordingly, there is very little frictional resistance to rotation of the arm through the channel in that direction since the strip 72 is not compressed in the gap 83.

The flexibility of the strip 72, i.e., its resistance to flexing in the direction of arrows 73 in FIG. 7 should be low enough so as not to offer any significant resistance to rotation in a clockwise direction. It should be noted that the length of the strip which is allowed to flex when the arm passes through the channel in the clockwise direction in FIG. 6, i.e., f–h, is much greater than the length of the strip which is allowed to flex when the arm passes through the channel in the counterclockwise direction, i.e., f–e. Thus, more force is required to flex the shorter exposed strip 72 upward in FIGS. 7–9 to fit through the channel 30 than to flex the longer exposed ends vertically downwardly to fit through the channel because a greater length of the strip is allowed to flex when flexed downwardly. Accordingly, the resistance to rotation in the clockwise direction is much less than in the counterclockwise direction, not only because of the substantial lack of frictional resistance to clockwise rotation, but also because there is substantially less force required to flex the ends of the strip to fit through the channel 30 when rotating the pad clockwise. Thus, the resistance to rotation in both directions is a function of the coefficient of friction of the strip material, the thickness of the strip material, and the stiffness of the strip material. Any one or more of these properties of the strip material can be used to set the desired force necessary for rotation beyond the contact point in either direction. For instance, if desired, a low friction material can be employed and the resistance to rotation can be primarily a function of flexibility, with friction playing almost no part.

It has been found that rubber strips cut from side wall segments of truck-tire carcasses provide acceptable material in terms of flexibility properties and surface friction properties to serve as rubber strips 72.

Of course, if in a particular stabilizer pad/arm combination, it is desirable to better prevent self-flipping in either direction, another steel plate 71 substantially of the same dimension as the top steel plate 70 can be placed between the top surface 14a of the arm 14 and the bottom surface of the rubber strip 72, as shown in FIG. 10, so as to offer the same resistance to rotation of the arm in the channel in both directions. Further, the steel plate 70 need not be coupled to the arm by a U bolt surrounding the arm but may simply be bolted to the arm itself, also as illustrated in FIG. 10. Alternately, the strip may be glued to the arm, eliminating the need for a steel plate. Even further, a stabilizer arm such as illustrated at 98 in FIG. 11 may be shaped with a stepped cross-section as shown in FIG. 11 with two rubber strips 95,97 glued or otherwise attached to the arm 98.

Even further, if resistance to rotation is to be provided in both directions, a compressible frictional pad 90 can be bolted, glued or otherwise fixed to the side surfaces 14d and 14e of the arm 14 which provide a high friction press fit between side walls 14d and 14e of the arm and side walls 24a and 26a of the stabilizer pad 18, as shown in FIG. 12.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A stabilizer for an earth moving apparatus comprising;

an arm extending from said earth moving apparatus, a stabilizer pad having a plate having first and second ground contact faces and pivotably coupled to said arm such that said plate can rotate about said arm over a predetermined range of rotation to engage a ground surface with either ground contact face, and friction means fixedly coupled to one of said arm and said pad and positioned so as to engage the other of said arm and said pad over at least a portion of the range of rotation of said pad and provide a frictional resistance to rotation of said pad relative to said arm in a first direction.

2. A stabilizer as set forth in claim 1 wherein said friction means provides substantially no resistance to rotation in a second direction of rotation.

3. A stabilizer as set forth in claim 1 wherein said friction means comprises a compressible member and, over at least a portion of the range of rotation of said plate, the distance between said pad and said arm defines a gap of a first width, said compressible member having a thickness greater than said gap width, said member positioned such that said member fills said gap over at least a portion of the range of rotation of said pad.

4. A stabilizer as set forth in claim 3 wherein said friction means further comprises a rigid member overlying substantially all of said compressible member except for at least one edge, said rigid member defining the width of said gap.

5. A stabilizer as set forth in claim 4 wherein said friction means is coupled to said arm and contact between said friction means and said pad when said pad is rotated in said first direction biases said friction means into said gap.

6. A stabilizer as set forth in claim 5 wherein contact between said friction means and said pad when said pad is rotated in a second direction biases said friction means away from said gap.

7. A stabilizer as set forth in claim 5 wherein said compressible member is formed of rubber.

8. A stabilizer as set forth in claim 3 wherein said compressible member is formed of side wall segments of truck-tire carcasses.

9. A stabilizer as set forth in claim 4 wherein said rigid member is a steel plate.

10. A stabilizer for an earth moving apparatus comprising;

an arm extending from said earth moving apparatus, a stabilizer pad having a plate having first and second ground contact faces and pivotably coupled to said arm such that said plate can rotate about said arm over a predetermined range to engage a ground surface with either ground contact face, said stabilizer pad having side walls defining a channel through which said arm extends over a portion of the range of rotation of said plate, a rigid member coupled to said arm, said rigid member and said side walls defining a gap of a first width between said rigid plate and said side walls, a friction member trapped between said rigid member and said arm sized and positioned so as to contact said stabilizer pad over a portion of the range of rotation of said pad and provide a frictional resistance to rotation of said pad relative to said arm in a first direction.

11. A stabilizer as set forth in claim 10 wherein said friction member comprises a compressible strip having a high friction surface, said strip having a thickness greater than said first width and a length so that said strip extends beyond said rigid member and said strip is squeezed in the direction of its thickness in said gap over said portion of the range of rotation of said pad when said plate is rotated in said first direction and is not squeezed in said gap when said pad is rotated in a second direction.

12. A stabilizer for an earth moving apparatus comprising;

an arm extending from said earth moving apparatus, a stabilizer pad having a plate having first and second ground contact faces and pivotably coupled to said arm such that said plate can rotate about said arm over a predetermined range of rotation to engage a ground surface with either ground contact face, and a flexible member fixedly coupled to one of said arm and said pad, said flexible member being flexible between an unbiased position in which said member engages the other said arm and said pad over at least a portion of the range of rotation of said pad and prevents further rotation of said pad relative to said arm and a first biased position in which said pad can rotate over said portion of the range of rotation, wherein a first amount of force must be applied to said member to flex it from the unbiased position to the first biased position to allow further rotation of said pad in at least a first direction.

13. A stabilizer as set forth in claim 12 wherein said member is flexible to a second biased position when said pad is rotated in a second direction and wherein a second amount of force must be applied to said member to flex it from the unbiased position to the second biased position and wherein rotation of said pad through said portion of the range of rotation in said first direction requires said member to be flexed from the unbiased position to said first biased position and rotation of said pad in said second direction through said portion of the range of rotation requires said member to be flexed from said unbiased position to said second biased position and further wherein said first predetermined force is greater than said second predetermined force.

14. A stabilizer as set forth in claim 13 wherein said arm passes through a channel in said pad over said portion of the range of rotation and said flexible member comprises a flexible strip extending from said arm, said strip dimensioned so as to be unable to pass through said channel in said unbiased position.

15. A stabilizer as set forth in claim 14 where said stabilizer further comprises a rigid member overlying said flexible member so as to restrain a portion of said flexible member from flexing.

* * * * *